June 25, 1929.  W. H. CAMPBELL  1,718,330
GAS PREHEATER
Filed Sept. 3, 1926
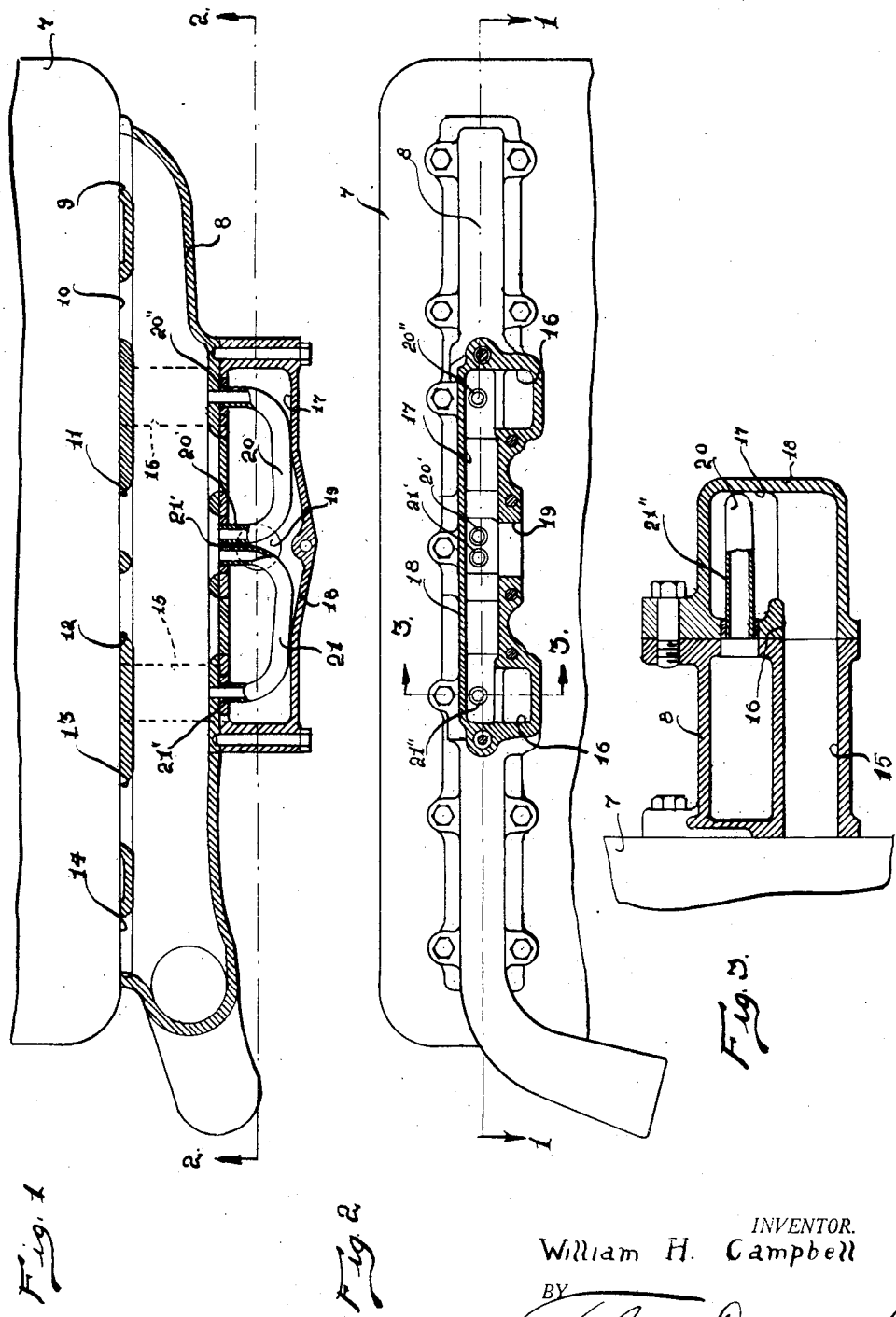
INVENTOR.
William H. Campbell
BY
[signature]
ATTORNEY.

Patented June 25, 1929.

1,718,330

UNITED STATES PATENT OFFICE.

WILLIAM H. CAMPBELL, OF DETROIT, MICHIGAN.

GAS PREHEATER.

Application filed September 3, 1926. Serial No. 133,359.

My invention relates to a new and useful improvement in a manifold for internal combustion engines and has for its object the provision of a manifold in which the exhaust gases will be discharged through the intake manifold so that the incoming gases in the intake manifold will be preheated prior to entering the combustion chamber.

Another object of the invention is the provision in the intake manifold of conduits for conducting the gases from in front of the exhaust ports through the intake manifold and thence outwardly so that a heating effect of the gases is had.

Another object of the invention is the provision of a manifold so constructed and arranged as to economize on fuel consumption and to eliminate carbonization in the motor.

Other objects will appear hereinafter.

The invention consists in the combination and arrangement of parts hereinafter described and claimed.

The invention will be best understood by a reference to the accompanying drawings which form a part of this specification and in which, Fig. 1 is a sectional view taken on substantially line 1—1 of Fig. 2.

Fig. 2 is a sectional view taken on substantially line 2—2 of Fig. 1.

Fig. 3 is a fragmentary sectional view taken on substantially line 3—3 of Fig. 2.

In the drawings I have illustrated the invention applied to an internal combustion engine 7 having an exhaust manifold 8 and provided with exhaust ports 9, 10, 11, 12, 13 and 14. Intake passages 15 are formed on the underside of the manifold 8, these intake passages communicating through the opening 16 with the chamber 17 formed in the manifold 18 which is attached to the manifold 8, an intake port 19 being formed in the underside of the manifold 18, through which the fuel passes in passing into the combustion chambers.

It will be noted in the form shown that there are a pair of openings 16 so that the fuel intering the opening 19 is forced to travel through the chamber 17 throughout its entire length. Extending into the chamber 17 are U-shaped pipes 20 and 21, one of the legs 20′ and 21′ respectively of each of these pipes communicating with the manifold 8 opposite the outlet opening 11, so that when the exhaust takes place through the port 11 it is driven against the open ends 20′ and 21′ of these pipes 20 and 21. The other legs 20″ and 21″ also communicate with the manifold 8, as clearly appears from Fig. 1. The other ends, however, are not positioned opposite any of the exhaust ports, so that the blow delivered by the exhausting gases on the ends 20′ and 21′ will effect a travel of the exhausted gases through the pipes 20 and 21, thus effecting and exhausting through the intake manifold. These exhausted gases being heated will serve to heat the pipes 20 and 21, so that the incoming gases will be heated, thus vaporizing the fuel prior to its delivery to the combustion chamber and increasing the efficiency of the engine in operation. Due to the preheating and vaporizing of the incoming gases prior to entry into the combustion chamber more complete combustion is effected with a resultant economy in fuel consumption. Furthermore on account of the more complete combustion carbonization is practically eliminated in the engine. It is believed that the simplicity of the structure of the invention is apparent from the description and drawings, and that its durability as well as its utility is evident.

While I have illustrated and described the preferred form of structure shown, I do not wish to limit myself to the precise form of structure shown, but desire to avail myself of such variations and modifications as may come within the scope of the appended claims.

Having thus described my invention what I claim as new and desire to secure by Letters Patent is:

1. In combination with an internal combustion engine having combustion chambers and an exhaust manifold communicating therewith by exhaust ports: an intake manifold in communication at opposite ends through ports with said combustion chambers, said intake manifold having an intake port at its lower side; U-shaped pipes mounted in said intake manifold and projecting through the wall thereof, and communicating with said exhaust manifold, one end of each of said pipes communicating with said exhaust manifold opposite an outlet port thereof, and the other end communicating with said exhaust manifold in non-registration with an outlet port.

2. In combination with an internal combustion engine having an exhaust manifold and outlet ports communicating therewith: an intake manifold mounted on said exhaust manifold and communicating at opposite sides through downwardly directed ports with intake passages; and a pair of U-shaped pipes mounted in said intake manifold, adjacent legs of said pipes communicating with said exhaust manifold opposite an outlet port, and the other leg of each of said pipes communicating with said exhaust manifold in non-registration with an outlet port.

3. In combination with an internal combustion engine having an exhaust manifold and outlet ports communicating therewith: an intake manifold mounted on said exhaust manifold and communicating at opposite sides through downwardly directed ports with intake passages; a pair of U-shaped pipes mounted in said intake manifold, adjacent legs of said pipes communicating with said exhaust manifold opposite an outlet port, and the other leg of each of said pipes communicating with said exhaust manifold in non-registration with an outlet port, said intake manifold having an inlet port at its under side, centrally thereof, the incoming gases admitted through said inlet port travelling to opposite sides of said chamber around said pipes and through said downwardly directed ports into said intake passages.

In testimony whereof I have signed the foregoing.

WILLIAM H. CAMPBELL.